(12) United States Patent
Lodahl

(10) Patent No.: US 7,023,988 B2
(45) Date of Patent: Apr. 4, 2006

(54) COVER AND A METHOD OF USING THE COVER

(75) Inventor: Jesper Lodahl, Herlev (DK)

(73) Assignee: Nokia Corporation, Espoo (FI)

( * ) Notice: Subject to any disclaimer, the term of this patent is extended or adjusted under 35 U.S.C. 154(b) by 402 days.

(21) Appl. No.: 10/393,571

(22) Filed: Mar. 21, 2003

(65) Prior Publication Data

US 2004/0184599 A1 Sep. 23, 2004

(51) Int. Cl.
*H04M 1/00* (2006.01)
(52) U.S. Cl. .............................. 379/433.01; 379/433.1; 379/433.12; 379/433.13; 455/575.8; 455/90.3
(58) Field of Classification Search ........... 379/433.01, 379/433.1, 433.12, 433.13; 455/575.8, 90.3
See application file for complete search history.

(56) References Cited

U.S. PATENT DOCUMENTS 5,371,791 A * 12/1994 Schwartz et al. ...... 379/433.01
6,519,142 B1 * 2/2003 Lai et al. ................. 455/575.8

* cited by examiner

*Primary Examiner*—Ahmad F. Matar
*Assistant Examiner*—Quynh H. Nguyen
(74) *Attorney, Agent, or Firm*—Perman & Green, LLP.

(57) ABSTRACT

A cover for covering electric or electronic components positioned on a board or plate. The cover has a first part attached to the board or plate and a second part, which is detachably attached to the first part. The second part has a lid part and one or more side parts. The attachment comprises a number of elements which are rotatable from an engagement position with the first part to a free position, where the rotation is performed around an axis positioned farther from the lid portion than the actual element so that the lid part and side part(s) are not deformed unnecessarily in order for the second part to be reusable.

15 Claims, 4 Drawing Sheets

COVER AND A METHOD OF USING THE COVER

BACKGROUND OF THE INVENTION

1. Field of the Invention

The present invention relates to a cover for covering electric or electronic components on a board or plate, and in particular a cover for electro magnetically shielding components on a printed circuit board.

2. Brief Description of Related Developments

In e.g. mobile telephones, such covers are provided before use as two detachably attached parts of which a first part is attached to the PCB and the other is automatically positioned correctly. A later servicing of the components covered by the cover will then require removal of the detachably attached, second part.

However, in the normal covers, the removal requires deforming parts of the second part in a manner so that a lid part thereof is often deformed. A deformed second part should not be re-used, as it may provide a reduced electromagnetic shielding or mechanical attachment to the first part.

The present invention relates to a manner of avoiding that risk and increasing the number of reusable second parts.

SUMMARY OF THE INVENTION

In a first aspect, the invention relates to a cover for covering electric or electronic components positioned at a surface of a board or plate, the cover comprising:

a first part attached to the board or plate and a second part covering the electric or electronic components and having at least one side part and a lid part, the second part being detachably attached to the first part, the first part comprising a plurality of second surfaces having a non-zero angle with a direction, which is perpendicular to the surface, the second surfaces facing the surface of the board or plate, the second part comprising, at one or more of the side parts, one or more elements each engaging one or more corresponding second surfaces, when the second part is attached to the first part, each element being movably attached at an attachment area and being movable away from its corresponding second surface(s) in order to obtain disengagement thereof, each element being positioned between its corresponding attachment area and the lid part.

In the present context, electric or electronic components may be any components used in electronic circuitry, such as integrated circuits, transistors, resistors, diodes, impedances, coils, drivers, or the like.

Also, in the present context, a board or plate will normally be used for holding the components but preferably also, as is the case for a printed circuit board, for electrically interconnecting the components.

Normally, the components will be positioned at the surface of the board or plate and attached thereto, such as by soldering. However, at least part of the components may be provided in the board or partly therein.

As to the term, "cover", this may mean to visually cover or cover with other purposes, such as to electrically shield the components in the cover from influences from the surroundings or shield the surroundings from influences, such as electromagnetic radiation, from the components.

Naturally, the cover may have any suitable shape for performing its intended covering function. Normally, that shape would have a lid part overlaying (seen in a projection perpendicular to the surface of the board/plate) the components and one or more side parts engaging and/or holding the lid part and covering the sides of the components. There need not be a strict border or demarcation of a border between the lid part and the side part(s).

Any suitable shape of the second surfaces may be used for providing engagement between the first and second parts, such as surfaces of holes in the first part, surfaces of indentations or cut away parts of the first part.

The movement of the elements may be facilitated by hinges (providing rotation) or by deformable parts (providing rotation or bending) of the elements or side parts of the second part. Thus, a movement axis may not be exactly defined especially in the example where a deformable attachment area, normally a part intentionally being made weaker by providing it more narrow, thinner or the like, is used for providing the rotation. The rotational or bending axis could also be obtained from the construction of the attachment area as commonly known by a person skilled in the art. However, the operation of a bending and a rotation may be exactly the same.

In the present context, "between" preferably means that, functionally, the movement/rotation/bending is performed at a point farther away from the lid part than the element, so that any stress or influence generated by the rotation/bending/deformation is performed at that distance from the lid part. In that respect, "between" would mean "between" when following the shape of the cover along a predetermined line.

In one embodiment, at least one side part forms an at least substantially straight side of the second part and wherein the axes of rotation of the elements at that side part are at least substantially parallel to the side. This has advantages both when manufacturing and when removing the second part in that the rotation of the element may then be at a right angle to the side part.

In that situation, preferably, the straight side and the lid part meet along a straight line being at least substantially parallel with the axes of rotation. In that manner, forming the second part of e.g. sheet metal is facilitated.

In another embodiment, each element is adapted to be moved by bending at a bending area positioned at the attachment area. Then, the elements may be adapted to be bent around an elongated bending area and at least one side part forms an at least substantially straight side of the second part, wherein the bending areas of the elements at that side part are at least substantially parallel to the side.

In a preferred embodiment, the first part and the side part(s) of the second part define a first and a second projected (outer) contour, respectively, on the surface of the board or plate and wherein the first contour is positioned within the second contour. In that manner, the first part may be positioned inside the second part. This is especially an advantage when the first part and the second part at least abut between the attachment areas and the surface. In that situation, the elements could be adapted to be rotated/bent outward. Thus, when moving the elements, the abutment with the first part will provide part of the force and torque required to rotate/bend the elements. This is alternative to a set-up where the torque required is provided by other parts of the side part(s) or the lid part, whereby unintended deformation of the second part may be obtained.

A preferred cover is obtained when the second part has a number of at least substantially straight sides, and where the elements are positioned at two opposing sides of the second part.

In that manner, removal of the second part is facilitated, such as by a method comprising:

moving the elements at one of the straight sides to obtain disengagement with their corresponding second surfaces, and removing the second part by moving the second part around the elements at the other straight side.

This method may further comprise the step of subsequently re-positioning the second part and providing engagement between the one or more elements and their corresponding second surfaces.

A second aspect of the invention relates to a method for using the above cover, the method comprising:

moving one or more of the elements to obtain disengagement with their corresponding second surfaces, removing the second part, re-positioning the second part and providing engagement between the one or more elements and their corresponding second surfaces.

Again, the rotation/bending may be obtained using a hinge or a deformable part.

The removal step may be followed by a step of actually accessing the components in order to e.g. repair or replace one or more thereof.

The providing step preferably comprises the second step of rotating/bending the rotated/bent elements into a predetermined position. This second moving step may be performed before (in order to obtain a click action when repositioning) or after repositioning the second part.

A final aspect of the invention relates to a mobile telephone comprising a printed circuit board holding one or more electric or electronic components covered by a cover as described in relation to the first aspect of the invention.

BRIEF DESCRIPTION OF THE DRAWINGS

In the following, a preferred embodiment is described with reference to the accompanying drawing, wherein.

DETAILED DESCRIPTION OF THE PREFERRED EMBODIMENT(S)

Figure 1:
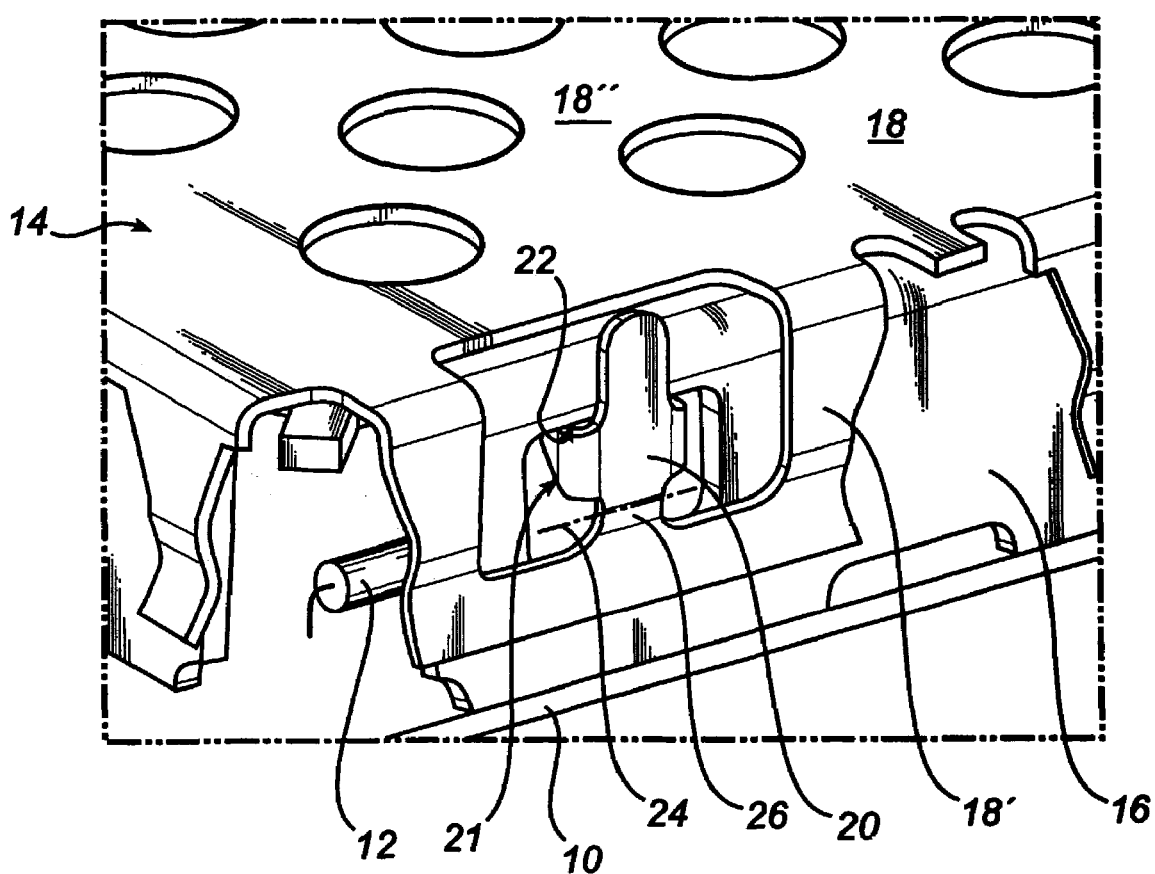
FIG. 1 illustrates a first embodiment of a cover having a first and a second part, where the parts engage and the cover is kept in place.

In FIG. 1, a printed circuit board 10 is seen on which one or more electronic or electric components 12 are positioned. These components are covered by a cover 14 comprising a first part 16 attached, such as by soldering, to the board 10 and a second part 18 having a number of side parts 18' and a lid part 18". The cover may be metallic and used for electromagnetic shielding of the components either from the outside thereof or from the inside thereof (or both).

The cover 18 will normally have a plurality of straight sides 18' and be made of a single piece of metal bent into the lid part 18" and the sides 18'.

The shaping and attachment of the second part 18 to the first part 16 in order to obtain sufficient electromagnetic shielding is known, and the normal manner of attaching the first and second parts would be to provide holes in the first part an introduce parts, such as small protrusions, of the second part into the holes. Shields of this type have a large number of contacts along the periphery of the boundary between the first and second parts. Only a few of such contacts are, however, required to actually perform the physical maintaining of the relative positions of the first and second parts. The remaining contacts are merely required in order to ensure a sufficient shielding.

Normally, when providing the cover, the first and second parts are provided pre-attached (using the elements), where after the first part is attached to the board 10. Detachment of the first and second parts is not obtained before access to the components is required.

The normal manner of removing the cover is to deform the parts having these protrusions, but outwardly in a manner so that the overall shape of the cover may be changed and the cover rendered useless for shielding purposes. This is due to an excess strain on the bend between the lid part and the actual side part.

In the present embodiment, elements 20 are provided which extend into holes having upper surfaces 22 with which the elements 20 engage in order to maintain the part 18 in place in relation to the part 16.

When wishing to remove the part 18, the elements 20 are rotated or bent out of engagement with the surfaces 22 around a rotation axis or attachment/bending area 24 defined by a rotation/bending part 26 of the element 20.

When rotating/bending the element 20, the adjacent (lower—toward the board) parts of the side part 18' will be forced inwardly toward the first part 16, whereby the bend between the side part 18' and the lid part 18" is not altered or deformed.

In this manner, the second part may be re-used by re-positioning it and rotating the elements 20 back into engagement with the surfaces 22–either without rotating the elements 20 back into their initial positions or after having done that (whereby a click locking action is obtained). It should be noted that also this rotating back of the elements has no adverse impact on the bend between the lid part 18' and side parts 18" again due to the position of the rotation axis 24 or part 26 being positioned far from the bend at the lid 18'.

The clicking action is obtained by an angled surface 21 of the element, which is adapted to bend (but elastically) the element 20 outwards while repositioning the cover.

Another advantage is also that the elements 20 may be engaged from the top of the cover 18 instead as at the bottom of the side parts 18' as has been normal hitherto. Easier access also reduces the probability of accidental deformation.

Figure 2:
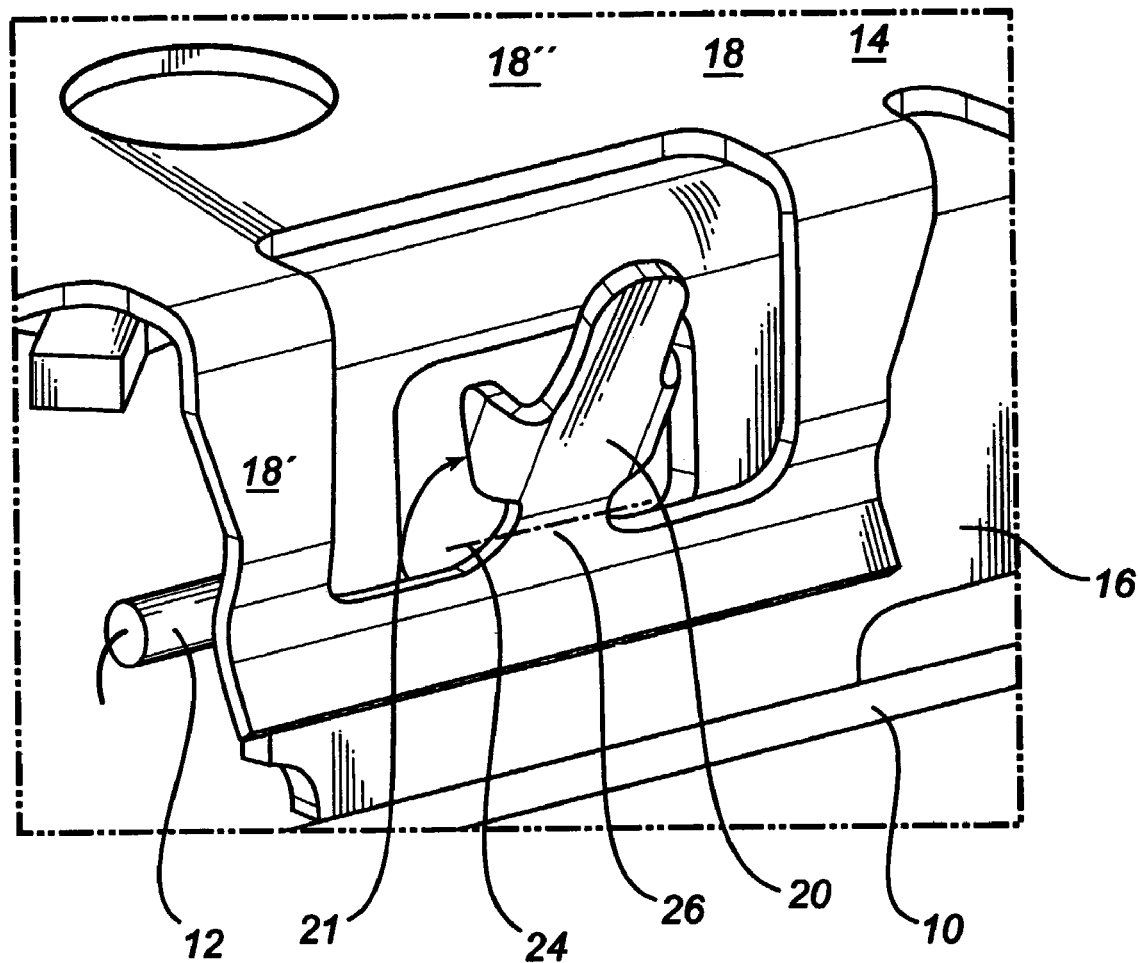
FIG. 2 illustrates the embodiment of FIG. 1, where disengagement has been obtained and the cover may be removed in order to access electronic or electric components covered thereby.
Figure 3:
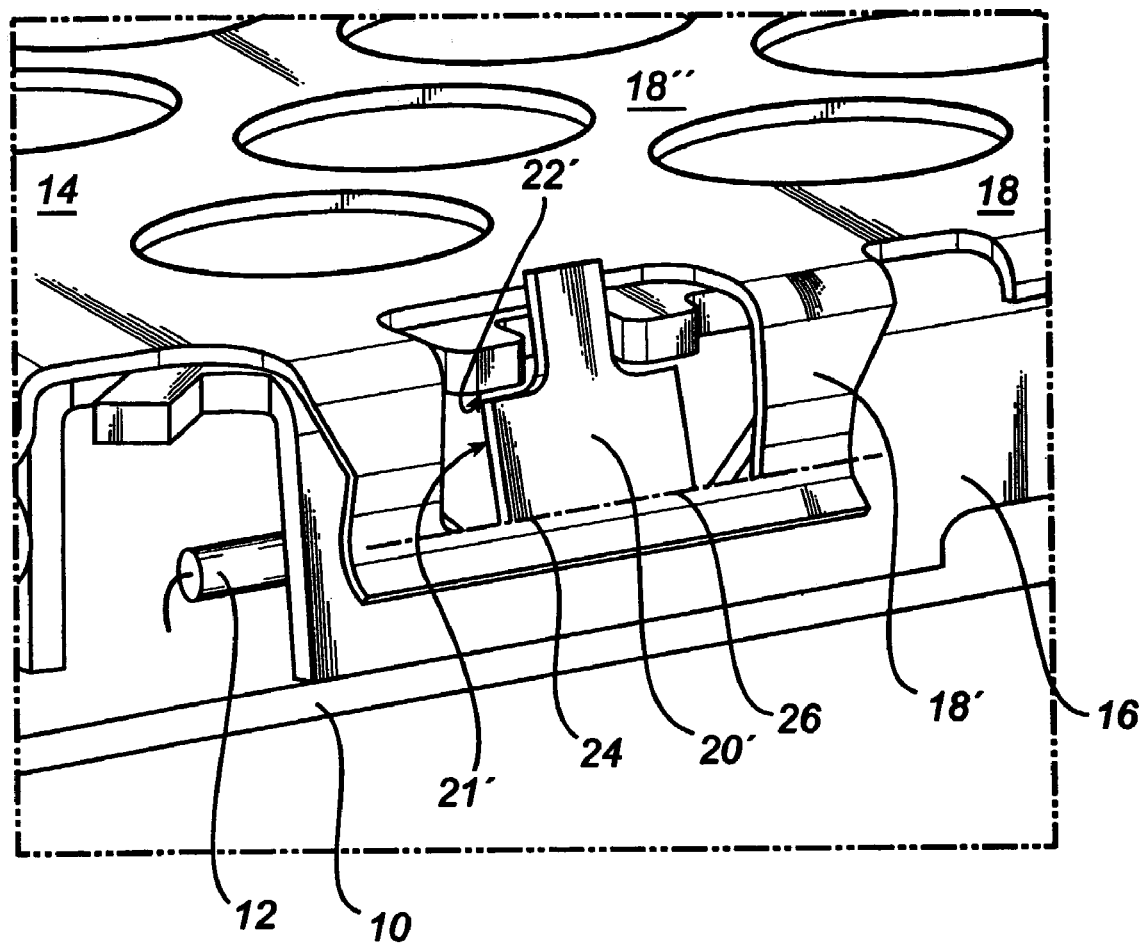
FIG. 3 illustrates a second embodiment of a cover having a first and a second part, where the parts engage and the cover is kept in place.
Figure 4:
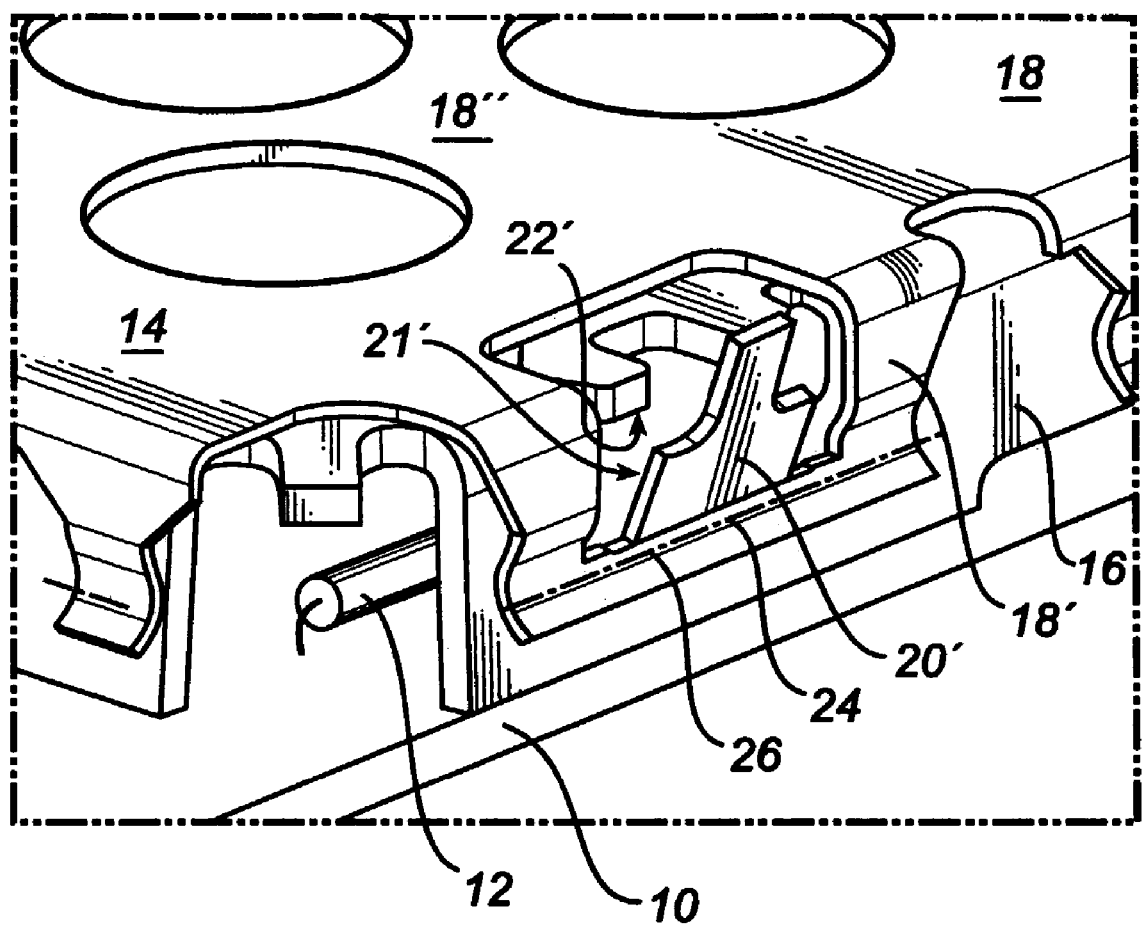
FIG. 4 illustrates the embodiment of FIG. 3, where disengagement has been obtained and the cover may be removed in order to access electronic or electric components covered thereby.

FIGS. 3 and 4 illustrate an embodiment similar to that of FIGS. 1 and 2, but where the elements 20 of FIGS. 1 and 2 have been replaced with the elements 20' which have a different shape and also differently shaped engaging surfaces 21' and 22'. These elements are designed to work well when used as torsion springs, when they are bent out and then released they snap back into position, which makes remounting easier. As the lid part 18" is to be removed the elements 20' are bent out. As the cover is removed completely the elements 20' are released and they snap back into their original position. When the lid or cover is to be mounted again the lid part 18" is simply pressed down on top of the frame part 16 and all the elements 20' are pressed out as they pass the surfaces 22 and as they have passed they spring back into position and the surfaces 21' and 22' now engages and the cover is held in place. This torsion spring snap lock is highly beneficial when in use as it is easy to take off and then re-position the cover without damaging or bending any pars, thus making it highly re-usable.

The parts 16 engaging side is normally leaning a bit inwards making the surfaces of frame part 16 and lid part 18 not parallel as known to persons skilled in the art to make the friction between the two parts higher. This leaning inclination is only in the order of a few degrees and this technique could also be used in the contact areas of other parts of the frame and lid of the cover according to the invention. It is also very hard to state any exact inclines as these are very susceptible to manufacturing variations.

It should be obvious o the skilled person that many variations of the described inventions is possible within the scope of this invention and these variations and modifications should be regarded as part of the invention.

What is claimed is:

1. A cover for covering electronic components positioned at a surface of a printed circuit board or plate, the cover comprising:
    a first part attached to the printed circuit board or plate and
    a second part covering the electronic components of the printed circuit board or plate and having at least one side part and a lid part, the second part being detachably attached to the first part,
    the first part comprising at least one attachment area having a second surface, the second surface being on a separate plane from, substantially parallel to and facing a surface of the printed circuit board or plate,
    the at least one side part of the second part comprising, at least one engaging element, each of the at least one engaging element engaging a corresponding second surface of the at least one attachment area, when the second part is attached to the first part, each of the at least one engaging element being movably attached at an attachment area and being movable away from its corresponding second surface in order to obtain disengagement thereof,
    each of the at least one engaging element being positioned between a corresponding one of the at least one attachment area and the lid part.

2. A cover according to claim 1, wherein each of the at least one engaging element is rotatable around a rotation axis and at least one of the at least one side part of the second part forms an at least substantially straight side of the second part, wherein the axes of rotation of the at least one engaging element are at least substantially parallel to the at least substantially straight side of the second part.

3. A cover according to claim 2, wherein the straight side and the lid part meet along a straight line being at least substantially parallel with the axes of rotation.

4. A cover according to claim 1, wherein each of the at least one engaging element is adapted to be moved by bending at a bending area positioned at each of the at least one attachment area.

5. A cover according to claim 4, wherein each of the at least one engaging element is adapted to be bent around an elongated bending area and at least one of the at least one side part of the second part forms an at least substantially straight side of the second part, wherein the bending areas of the at least one engaging element are at least substantially parallel to the substantially straight side of the second part.

6. A cover according to claim 1, wherein the first part and the at least one side part of the second part define a first and a second projected contour, respectively, on the surface of the printed circuit board or plate and wherein the first contour is positioned within the second contour.

7. A cover according to claim 6, wherein the first part and the second part at least abut between the second surface of the at least one attachment area and a surface of the at least one engaging element.

8. A cover according to claim 6, wherein each of the at least one engaging element is adapted to be moved away from the first part.

9. A cover according to claim 1, wherein the second part has a number of at least substantially straight sides, and where each of the at least one engaging element is positioned at two opposing sides of the second part.

10. A method comprising utilizing the cover of claim 1, the method further comprising:
    moving at least one of the at least one engaging element to obtain disengagement with their corresponding second surface of the at least one attachment area,
    removing the second part,
    re-positioning the second part and providing engagement between at least one of the at least one engaging element and their corresponding second surface of the at least one attachment area.

11. A method according to claim 10, wherein the providing step comprises the second step of moving the at least one engaging element into a predetermined position.

12. A method according to claim 11, wherein the second moving step is performed before or after re-positioning the second part.

13. A method for using the cover according to claim 11, the method comprising:
    moving the at least one engaging element at one of a number of at least substantially straight sides to obtain disengagement with their corresponding second surface of the at least one attachment area, and
    removing the second part by moving the second part around the at least one engaging element at another of the at least substantially straight sides.

14. A method according to claim 12, further comprising the step of subsequently re-positioning the second part and providing engagement between at least one of the at least one engaging element and their corresponding second surface of the at least one attachment area.

15. A mobile telephone comprising a printed circuit board holding electronic components covered by a cover according to claim 1.

* * * * *